(12) United States Patent
Ghannam et al.

(10) Patent No.: US 10,807,569 B2
(45) Date of Patent: Oct. 20, 2020

(54) VEHICLE WASHER FLUID DELIVERY DIAGNOSTICS AND CLEANING

(71) Applicant: Ford Global Technologies, LLC, Dearborn, MI (US)

(72) Inventors: Mahmoud Yousef Ghannam, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 15/597,091

(22) Filed: May 16, 2017

(65) Prior Publication Data
US 2018/0334140 A1    Nov. 22, 2018

(51) Int. Cl.
*B60S 1/48*   (2006.01)
*B60S 1/56*   (2006.01)
*B60S 1/52*   (2006.01)
*B60S 1/54*   (2006.01)
*B60S 1/08*   (2006.01)

(52) U.S. Cl.
CPC ............. *B60S 1/485* (2013.01); *B60S 1/0848* (2013.01); *B60S 1/481* (2013.01); *B60S 1/52* (2013.01); *B60S 1/54* (2013.01); *B60S 1/56* (2013.01)

(58) Field of Classification Search
CPC ........ B60S 1/0848; B60S 1/485; B60S 1/481; B60S 1/52; B60S 1/54; B60S 1/56; B60S 1/0844; B05B 15/52; B05B 15/557; G06T 7/00; H04W 4/46
See application file for complete search history.

(56) References Cited

U.S. PATENT DOCUMENTS

| 3,633,827 A | 1/1972 | Novak |
| 7,628,144 B2 * | 12/2009 | Vetrovec ................. F02B 33/44 |
| | | 123/541 |
| 2006/0130877 A1 * | 6/2006 | Huntzicker ........... B60S 1/0818 |
| | | 134/18 |

(Continued)

FOREIGN PATENT DOCUMENTS

| CN | 202700884 U | * | 1/2013 |
| CN | 202700884 U |   | 1/2013 |

(Continued)

OTHER PUBLICATIONS

Search Report dated Oct. 19, 2018 for GB Patent Application No. GB 1807852.7 (4 pages).

(Continued)

*Primary Examiner* — Douglas Lee
(74) *Attorney, Agent, or Firm* — Frank Lollo; Eversheds Sutherland (US) LLP

(57) ABSTRACT

Method and apparatus are disclosed for vehicle washer fluid delivery diagnostics and cleaning. An example vehicle includes an engine, a windshield, a camera for capturing images of the windshield, a nozzle, and a washer fluid controller. The washer fluid controller is to instruct the nozzle to spray washer fluid responsive to detecting the windshield is obstructed based upon a first image, determine whether the nozzle emitted a target spray based upon a second image, and pump pressurized air through the nozzle upon detecting the target spray was not emitted and the engine is off.

12 Claims, 6 Drawing Sheets

(56) References Cited

U.S. PATENT DOCUMENTS

| | | | | |
|---|---|---|---|---|
| 2013/0092758 A1* | 4/2013 | Tanaka | ................... | B60S 1/52 |
| | | | | 239/284.1 |
| 2013/0292488 A1* | 11/2013 | Jeuffe | ................... | B60S 1/48 |
| | | | | 239/127 |
| 2014/0270391 A1* | 9/2014 | Addington | ........... | G01B 11/303 |
| | | | | 382/108 |
| 2015/0088374 A1* | 3/2015 | Yopp | ................. | B60H 1/00764 |
| | | | | 701/36 |

FOREIGN PATENT DOCUMENTS

| | | | | |
|---|---|---|---|---|
| DE | 2943887 A1 | 5/1981 | | |
| DE | 102007020912 A1 | 11/2008 | | |
| GB | 2555932 A | 5/1918 | | |
| GB | 2289427 A | 11/1995 | | |
| GB | 2471674 A * | 1/2011 | .............. | B60S 1/485 |
| GB | 2471674 A | 1/2011 | | |
| JP | S63116961 A * | 5/1988 | | |
| JP | S63116961 A | 5/1988 | | |
| KR | 100680365 B1 | 2/2007 | | |

OTHER PUBLICATIONS

Samson Dikeman, How to Clean and Maintain Windshield Washers, Jul. 5, 2016, 10 pages.

\* cited by examiner

VEHICLE WASHER FLUID DELIVERY DIAGNOSTICS AND CLEANING

TECHNICAL FIELD

The present disclosure generally relates to washer fluid and, more specifically, to vehicle washer fluid delivery diagnostics and cleaning.

BACKGROUND

Typically, vehicles include windshields, such as a front windshield and a rear windshield, through which a driver and/or other occupant(s) view a surrounding area. Some vehicles also include cameras that capture image(s) and/or video of the surrounding area. In some instances, the image(s) and/or video captured by camera(s) are presented to the driver to facilitate the driver in operating the vehicle. In other instances, the captured image(s) and/or video are analyzed to facilitate autonomous or semi-autonomous operation of the vehicle. Oftentimes, washer fluid is applied to the windshield(s) and/or camera(s) of the vehicle when debris and/or other material (e.g., rain, ice, snow) is located on those windshield(s) and/or camera(s).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle washer fluid delivery diagnostics and cleaning. An example disclosed vehicle includes an engine, a windshield, a camera for capturing images of the windshield, a nozzle, and a washer fluid controller. The washer fluid controller is to instruct the nozzle to spray washer fluid responsive to detecting the windshield is obstructed based upon a first image, determine whether the nozzle emitted a target spray based upon a second image, and pump pressurized air through the nozzle upon detecting the target spray was not emitted and the engine is off.

An example disclosed method for facilitating vehicle washer fluid delivery includes detecting, via a processor, whether a windshield is obstructed based upon a first image captured by a camera. The example disclosed method also includes instructing a nozzle to spray washer fluid responsive to detecting the windshield is obstructed, determining whether the nozzle emitted a target spray based upon a second image, and pumping pressurized air through the nozzle responsive to detecting the target spray was not emitted and an engine is off.

An example disclosed vehicle includes an engine, a camera including a lens, a nozzle, and a washer fluid controller. The washer fluid controller is to instruct the nozzle to spray washer fluid responsive to detecting the lens is obstructed based upon a first image, determine whether the nozzle emitted a target spray based upon a second image, and pump pressurized air through the nozzle upon detecting the target spray was not emitted and the engine is off.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
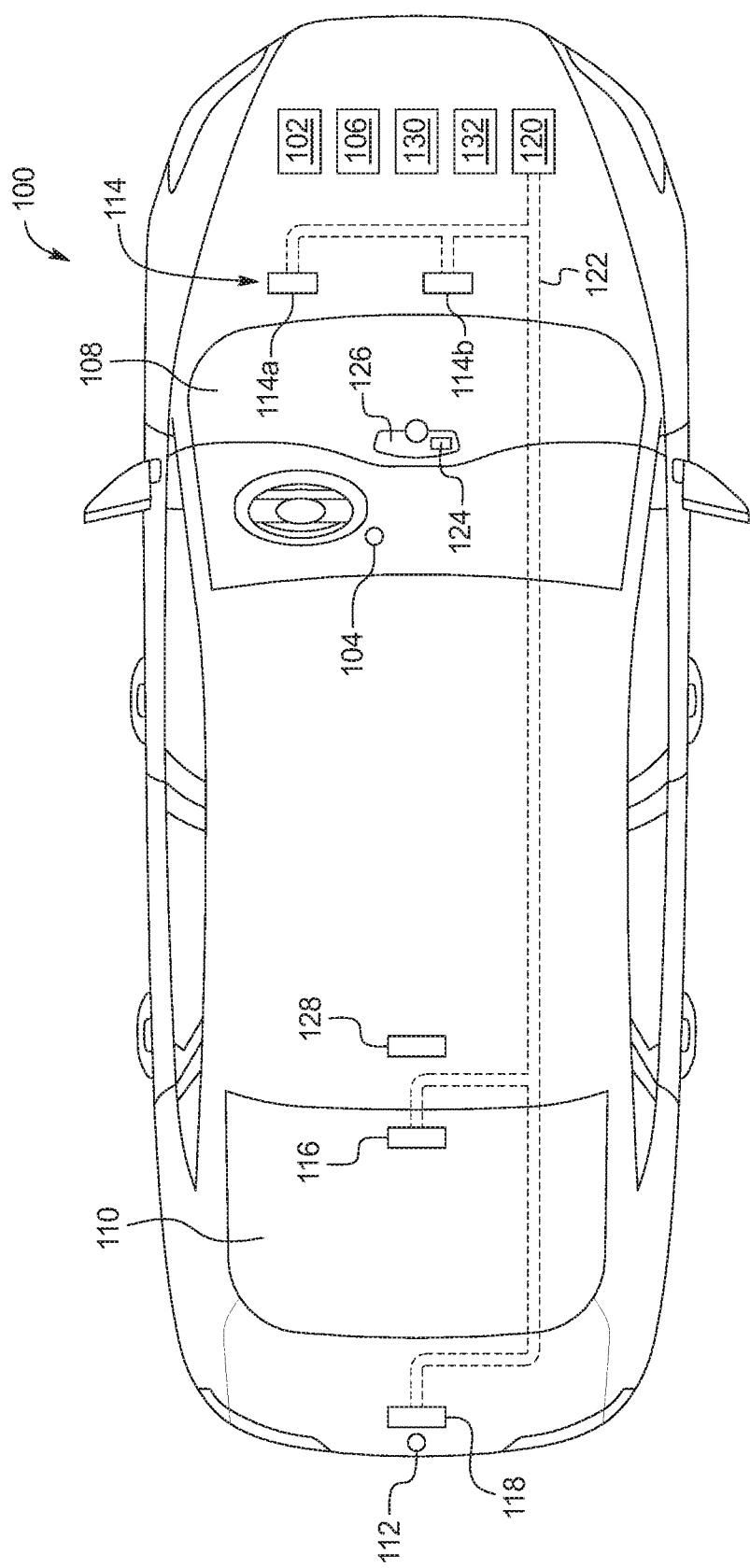
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include windshields, such as a front windshield and a rear windshield, through which a driver and/or other occupant(s) view a surrounding area. Some vehicles also include cameras that capture image(s) and/or video of the surrounding area. For example, the image(s) and/or video captured by camera(s) may be presented to the driver to facilitate the driver in operating the vehicle and/or analyzed to facilitate autonomous or semi-autonomous operation of the vehicle. Some vehicle cameras are located within a cabin of the vehicle and are directed toward a windshield and/or window through which image(s) and/or video of the surrounding area of the vehicle are captured. Other vehicle cameras are located along an external surface of the vehicle to enable the camera to capture image(s) and/or video of the surrounding area of the vehicle. Oftentimes, washer fluid is applied to the windshield(s) and/or external camera(s) of the vehicle when debris and/or other material (e.g., rain, ice, snow) is located on those surfaces. In some instances, the washer fluid is unable to be applied and/or is able to be only partially applied. For example, the washer fluid may incompletely applied due to the washer fluid being frozen, a washer fluid nozzle being clogged, a washer fluid reservoir being empty or damaged, a washer fluid line being severed and/or otherwise damaged, etc.

Example methods and apparatus disclosed herein include a washer fluid controller that diagnoses whether washer fluid nozzle(s) of a vehicle are clogged and/or whether delivery of washer fluid is being impeded to the washer fluid nozzle(s).

The washer fluid controller of the examples disclosed herein determines whether the washer fluid nozzle(s) are clogged and/or delivery of the washer fluid is impeded based upon image(s) and/or video of windshield(s) and/or camera len(s) to which the washer fluid is to be applied via the washer fluid nozzles. Upon detecting that one or more of the washer fluid nozzles is clogged, the washer fluid controller of the examples disclosed herein causes an electronic pump to pump pressurized air (e.g., heated pressurized air) through the washer fluid nozzles to unclog the washer fluid nozzles. In some examples, the electronic pump is an eTurbo pump that pumps pressurized air to an engine of the vehicle when the engine is on to improve the performance of the vehicle and pumps the pressurized air through the washer fluid nozzles when the engine is off to unclog the washer fluid nozzles.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes an engine 102, an ignition switch 104, and an eTurbo pump 106. The engine 102 includes an internal combustion engine, an electric motor, and/or any other power source that propels movement of the vehicle 100. The ignition switch 104 is utilized by a driver and/or another user of the vehicle 100 to operate the engine 102, a battery, and/or electronic accessories of the vehicle 100. For example, the ignition switch 104 includes an on-position for activating the engine 102 and the electronic accessories of the vehicle 100, an accessory position for activating the electronic accessories of the vehicle 100, and an off-position for deactivating the engine 102 and the electronic components of the vehicle 100. The eTurbo pump 106 provides pressurized air to the engine 102 when the engine 102 is on to increase performance of the engine 102. The eTurbo pump 106 of the illustrated example pumps pressurized air that is heated (e.g., via the engine 102) through washer fluid nozzles of the vehicle 100 when the engine 102 is off to unclog those washer fluid nozzles. That is, the eTurbo pump 106 is configured to pump pressurized to the engine 102 when the engine 102 is off as well as pump pressurized air through the washer fluid nozzles when the engine 102 is off.

As illustrated in FIG. 1, the vehicle 100 includes a windshield 108 (e.g., a front windshield, a first windshield) and a windshield 110 (e.g., a rear windshield, a second windshield). Further, the vehicle 100 of the illustrated example includes a camera 112 that is located on an exterior surface of the vehicle 100. For example, the camera 112 is a rearview camera (e.g., a first rearview camera) that captures image(s) and/or video of an area behind the vehicle 100 to facilitate autonomous driving maneuvers performed by the vehicle 100.

The vehicle 100 of the illustrated example also includes nozzles 114 that spray washer fluid onto the windshield 108 to facilitate cleaning of the windshield 108. For example, the nozzles 114 include a nozzle 114a (e.g., a first nozzle) and another nozzle 114b (e.g., a second nozzle) that each are to spray washer fluid onto the windshield 108. Further, the vehicle 100 includes a nozzle 116 (e.g., a third nozzle) that sprays washer fluid onto the windshield 110 to facilitate cleaning of the windshield 110 and a nozzle (e.g., a fourth nozzle) that sprays washer fluid onto the a lens of the camera 112 to facilitate cleaning of the camera 112. For example, the nozzle 114a is configured to emit a first target spray that applies a predetermined amount of washer fluid onto a predetermined area of a driver-side of the windshield 108 to enable the driver-side of the windshield 108 to be thoroughly cleaned. The nozzle 114b is configured to emit a second target spray that applies a predetermined amount of washer fluid onto a predetermined area of a passenger-side of the windshield 108 to enable the passenger-side of the windshield 108 to be thoroughly cleaned. The nozzle 116 is configured to emit a third target spray that applies a predetermined amount of washer fluid onto a predetermined area of the windshield 110 to enable the windshield 110 to be thoroughly cleaned. The nozzle 118 is configured to emit a fourth target spray that applies a predetermined amount of washer fluid onto a predetermined area of the lens of the camera 112 to enable the camera 112 to be thoroughly cleaned.

Further, the vehicle 100 also includes a reservoir 120 for containing a supply of washer fluid and a washer fluid line 122 that fluidly couples the reservoir 120 and the nozzles 114, the nozzle 116, and the nozzle 118 to facilitate delivery of the washer fluid from the reservoir 120 to the nozzle 114a, the nozzle 114b, the nozzle 116, and/or the nozzle 118.

As illustrated in FIG. 1, the vehicle 100 includes a camera 124 (e.g., a front-view camera) located on a rearview mirror 126 within a cabin of the vehicle 100 and another camera 128 (e.g., a second rearview camera) located within the cabin of the vehicle 100. For example, the camera 128 captures image(s) and/or video of an area in front of the vehicle 100 and/or the camera 128 captures image(s) and/or video of an area behind the vehicle 100 to facilitate autonomous driving maneuvers performed by the vehicle 100. Further, the camera 128 is oriented in a direction toward the windshield 108 to enable the camera 124 to capture image(s) and/or video of the windshield 108 and/or the area in front of the vehicle 100 through the windshield 108. The camera 128 is oriented in a direction toward the windshield 110 to enable the camera 128 to capture image(s) and/or video of the windshield 110 and/or the area behind the vehicle 100 through the windshield 110.

The vehicle 100 also includes a body control module 130 and a washer fluid controller 132. The body control module 130 controls one or more subsystems throughout the vehicle 100, such as power windows, power locks, an immobilizer system, power mirrors, etc. For example, the body control module 130 includes circuits that drive one or more of relays (e.g., to control wiper fluid, etc.), brushed direct current (DC) motors (e.g., to control power seats, power locks, power windows, wipers, etc.), stepper motors, LEDs, etc. Further, the washer fluid controller 132 controls the application of the washer fluid through the nozzles 114, the nozzle 116, and/or the nozzle 118.

In operation, the washer fluid controller 132 detects whether the windshield 108, the windshield 110, and/or the camera 112 is obstructed based upon image(s) captured by a camera. For example, the washer fluid controller 132 detects whether the windshield 108, the windshield 110, and/or the camera 112 is obstructed based upon image(s) captured by the camera 124, the camera 128, and/or the camera 112, respectively. For example, the washer fluid controller 132 analyzes first image(s) and/or video that are captured to determine whether there is an obstruction caused by material located on the windshield 108, the windshield 110, and/or the camera 112. In other examples, the washer fluid controller 132 detects whether the windshield 108, the windshield 110, and/or the camera 112 is obstructed based upon image(s) captured by a camera of another vehicle. The washer fluid controller 132 may receive, via a communication module of the vehicle 100, image(s) and/or video that are captured by a camera of another nearby vehicle (e.g., at a traffic stop) and sent to the communication module of the vehicle 100 via vehicle-to-vehicle communication. For example, a front-view camera of a vehicle stopped behind the vehicle 100 may collect image(s) and/or video of the windshield 110 that are sent to the washer fluid controller 132 of the vehicle 100 via vehicle-to-vehicle communication.

Upon detection of an obstruction while the engine 102 is on and/or off, the washer fluid controller 132 instructs the nozzle 114a, the nozzle 114b, the nozzle 116, and/or the nozzle 118 to spray washer fluid. Subsequently, the washer fluid controller 132 determines whether target spray(s) were emitted by the nozzle 114a, the nozzle 114b, the nozzle 116, and/or the nozzle 118. For example, the washer fluid controller 132 analyzes second image(s) and/or video that are captured to determine whether the target spray(s) were emitted. In other examples (e.g., when the ambient light is low such as at night), the washer fluid may be heated and the washer fluid controller 132 may utilize infrared image(s) and/or video captured by the camera 124 to detect whether the target spray was emitted. Further, the washer fluid controller 132 delays operation of one or more windshield wipers (e.g., windshield wipers 302 of FIG. 3) relative to instructing the washer fluid to be sprayed to enable the washer fluid controller 132 to analyze the washer fluid that is sprayed onto the windshield 108, the windshield 110, and/or the camera 112.

Responsive to detecting that one or more of the nozzles 114, the nozzle 116, and the nozzle 118 did not spray its respective target spray, the washer fluid controller 132 may wait for the engine 102 to be turned off and then pump pressurized air (e.g., via the eTurbo pump 106) through the nozzle 114a, the nozzle 114b, the nozzle 116, and/or the nozzle 118 for diagnostics and/or cleaning purposes.

For example, the washer fluid controller 132 instructs the nozzle 114a to spray washer fluid onto the windshield 108 responsive to detecting that the windshield 108 is obstructed. The washer fluid controller 132 determines whether the windshield 108 is obstructed (e.g., due to rain, snow, debris, and/or other material located on the windshield 108) based upon a first image and/or video that is captured via the camera 124 that is located within the cabin of the vehicle 100 adjacent to the windshield 108. The first image and/or video indicates whether, and to what extent, material is located on the windshield 108. Upon instructing the nozzle 114a to spray washer fluid onto the windshield 108 while the engine 102 is on and/or off, the washer fluid controller 132 determines whether the nozzle 114a emitted a target spray (e.g., a first target spray) onto the windshield 108 that facilitates the removal of the material from the windshield 108. For example, the washer fluid controller 132 determines whether the nozzle 114a emitted the target spray based upon a second image and/or video captured via the camera 124. The second image and/or video indicates whether, and to what extent, washer fluid was sprayed onto the windshield 108 via the nozzle 114a. In some examples, the washer fluid controller 132 compares the second image and/or video to a reference image and/or video, which includes a target spray emitted by the nozzle 114a, to determine whether the nozzle 114a has emitted the target spray.

Additionally or alternatively, the washer fluid controller 132 instructs the nozzle 114b to spray washer fluid onto the windshield 108 responsive to detecting that the windshield 108 is obstructed (e.g., based upon the first image and/or video captured via the camera 124). Upon instructing the nozzle 114b to spray washer fluid onto the windshield 108 while the engine 102 is on and/or off, the washer fluid controller 132 determines whether the nozzle 114b emitted a target spray (e.g., a second target spray) onto the windshield 108 (e.g., based upon the second image and/or video captured via the camera 124).

Upon determining that the nozzle 114a and/or the nozzle 114b did not emit the target spray of washer fluid onto the windshield 108, the washer fluid controller 132 may instruct the eTurbo pump 106 and/or another pump to pump pressurized air (e.g., heated pressurized air) through the nozzle 114a and/or the nozzle 114b when the engine 102 is off. That is, the washer fluid controller 132 waits until the engine 102 is off and then instructs the eTurbo pump 106 and/or another pump to pump pressurized air through the nozzle 114a and/or the nozzle 114b to unclog and/or clean the nozzle 114a and/or the nozzle 114b with the pressurized air.

Additionally or alternatively, the washer fluid controller 132 instructs the nozzle 116 to spray washer fluid onto the windshield 110 responsive to detecting that the windshield 110 is obstructed (e.g., based upon an image and/or video captured via the camera 128). Upon instructing the nozzle 116 spray washer fluid onto the windshield 110, the washer fluid controller 132 determines whether the nozzle 116 emitted a target spray (e.g., a third target spray) onto the windshield 110 (e.g., based upon a subsequent image and/or video captured via the camera 128). The washer fluid controller 132 of the illustrated example also instructs the nozzle 118 to spray washer fluid onto the lens of the camera 112 responsive to detecting that the lens of the camera 112 is obstructed (e.g., based upon an image and/or video captured via the camera 112). Upon instructing the nozzle 118 spray washer fluid onto the lens of the camera 112 while the engine 102 is on and/or off, the washer fluid controller 132 determines whether the nozzle 118 emitted a target spray (e.g., a fourth target spray) onto the lens of the camera 112 (e.g., based upon a subsequent image and/or video captured via the camera 112).

In examples in which each of the nozzles 114, the nozzle 116, and the nozzle 118 are monitored, the washer fluid controller 132 determines that the nozzle 114a and/or the nozzle 114b is clogged if the washer fluid controller 132 detects that the first target spray and the second target spray were not emitted while the third target spray and/or the fourth target spray were emitted. If the washer fluid controller 132 detects that the third target spray was not emitted while the fourth target spray was emitted, the washer fluid controller 132 determines that the nozzle 116 is clogged. If the washer fluid controller 132 detects that the fourth target spray was not emitted while the third target spray was emitted, the washer fluid controller 132 determines that the nozzle 118 is clogged. Upon determining that the nozzle 114a, the nozzle 114b, the nozzle 116, and/or the nozzle 118 is clogged, the washer fluid controller 132 instructs the eTurbo pump 106 and/or another pump to pump pressurized air (e.g., heated pressurized air) through the nozzle 114a, the nozzle 114b, the nozzle 116, and/or the nozzle 118 when the engine 102 is off.

Moreover, if the washer fluid controller 132 detects that none of the target sprays were emitted, the washer fluid controller 132 determines that delivery of washer fluid to the nozzles 114, the nozzle 116, and the nozzle 118 is impeded (e.g., due to the reservoir 120 being empty or damaged, due to the washer fluid line 122 being severed and/or otherwise damaged, due to a frozen washer fluid, etc.). If the washer fluid controller 132 detects that the third target spray and the fourth target spray were not emitted while the first target spray and the second target spray were emitted, the washer fluid controller 132 determines that delivery of washer fluid to the nozzle 116 and the nozzle 118 is impeded (e.g., due to a portion of the washer fluid line 122 being severed and/or otherwise damaged). In such instances, the washer fluid controller 132 provides an alarm to occupant(s) of the vehicle 100.

Figure 2D:
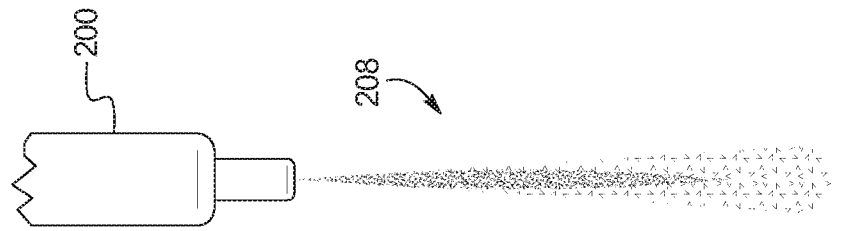
FIG. 2D depicts another example spray of the washer fluid from the nozzle of FIG. 2A.
Figure 2C:
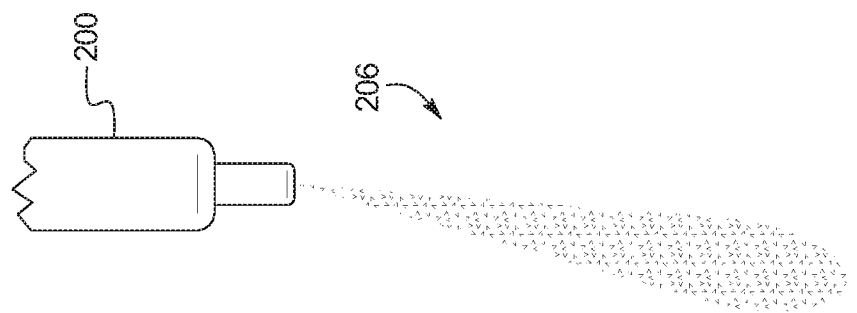
FIG. 2C depicts another example spray of the washer fluid from the nozzle of FIG. 2A.
Figure 2B:
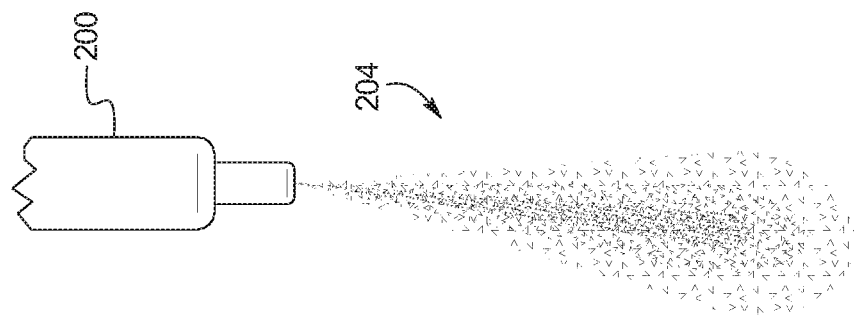
FIG. 2B depicts another example spray of the washer fluid from the nozzle of FIG. 2A.
Figure 2A:
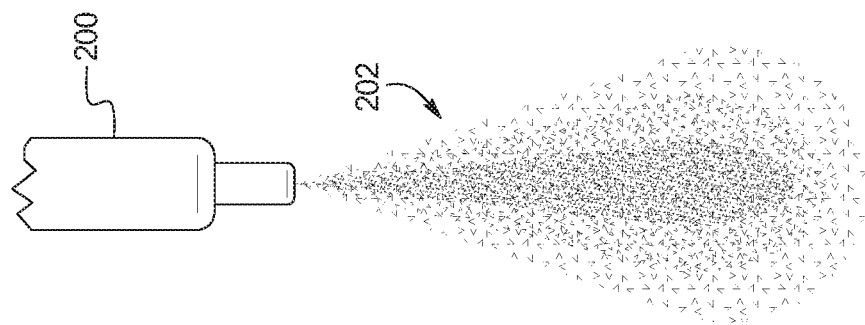
FIG. 2A depicts an example target spray of washer fluid from a nozzle of the vehicle of FIG. 1.

FIGS. 2A-2D illustrate examples washer fluid sprays emitted via a nozzle 200. More specifically, FIG. 2A depicts the nozzle 200 spraying an example target spray 202 of washer fluid, FIG. 2B depicts the nozzle 200 spraying an example partially blocked spray 204 of washer fluid, FIG. 2C depicts the nozzle 200 spraying another example partially blocked spray 206 of washer fluid, and FIG. 2D depicts the nozzle 200 spraying an example partially blocked spray 208 of washer fluid. The nozzle 200 of the illustrated example represents the nozzle 114a, the nozzle 114b, the nozzle 116, the nozzle 118, and/or any other washer fluid nozzle of the vehicle 100 (e.g., a washer fluid nozzle for a headlight, a washer fluid nozzle for a headlight, etc.).

As illustrated in FIG. 2A, the target spray 202 (e.g., the first target spray of the nozzle 114a, the second target spray of the nozzle 114b, the third target spray of the nozzle 116, the fourth target spray of the nozzle 118) extends centrally along a longitudinal axis of the nozzle 200 and has a fan angle (e.g., a fan angle 306 of FIG. 3) that is greater than or equal to a predetermined fan angle. The partially blocked spray 204 of FIG. 2B extends centrally along the longitudinal axis of the nozzle 200 but has a fan angle that is less than the predetermined fan angle. The partially blocked spray 206 of FIG. 2C is offset from the longitudinal axis of the nozzle 200 and has a fan angle that is less than the predetermined angle. The partially blocked spray 208 of FIG. 2D extends centrally along the longitudinal axis of the nozzle 200 but has a fan angle that is less than the predetermined angle.

Figure 3:
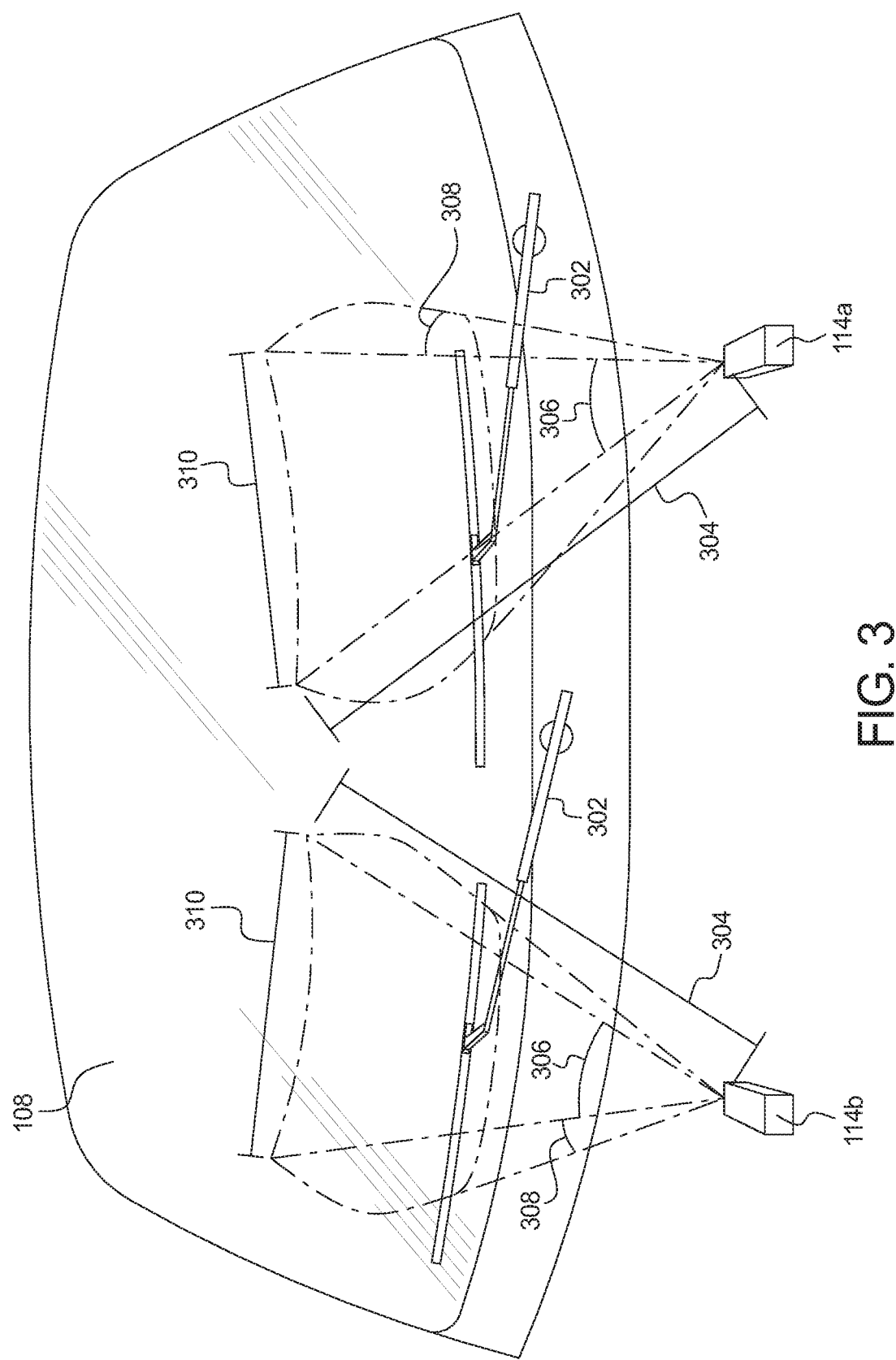
FIG. 3 illustrates an example front windshield of the vehicle of FIG. 1.

FIG. 3 illustrates the windshield 108 of the vehicle 100. As illustrated in FIG. 3, the nozzle 114a and the nozzle 114b are adjacent to the windshield 108 (e.g., located on a portion of a hood adjacent to the windshield 108) to enable the nozzle 114a and/or the nozzle 114b to spray washer fluid onto the windshield 108. The vehicle 100 also includes windshield wipers 302 that remove material (e.g., rain, snow, ice, debris, etc.) located on the windshield 108 by sliding along a surface of the windshield 108 to provide an unobstructed view through the windshield 108. The nozzle 114a and/or the nozzle 114b may spray washer fluid onto the windshield 108 immediately before the windshield wipers 302 slide along the windshield 108 to facilitate the windshield wipers 302 in removing the material from the windshield 108.

In the illustrated example, each of the nozzle 114a and the nozzle 114b emit a target spray of washer fluid. As illustrated in FIG. 3, a spray of washer fluid emitted by the nozzle 114a or the nozzle 114b is measured a fan length 304, a fan angle 306, a jet angle 308, and/or a fan width 310. For example, the fan length 304 is a distance that the washer fluid is sprayed, the fan angle 306 is an angle parallel to the windshield 108 at which the washer fluid is sprayed, the jet angle 308 is an angle perpendicular to the a windshield 108 at which the washer fluid is sprayed, and the fan width 310 is a maximum width at which the washer fluid is sprayed toward the windshield 108. For the target spray emitted via the nozzle 114a and/or the nozzle 114b, the fan length 304 is greater than or equal to a predetermined threshold, the fan angle 306 is greater than or equal to a predetermined threshold, the jet angle 308 is greater than or equal to a predetermined threshold, and/or the fan width 310 is greater than or equal to a predetermined threshold. In some examples, the washer fluid controller 132 adjusts the predetermined thresholds corresponding to a target spray based upon the temperature (e.g., cold temperatures correspond to lower thresholds) and/or wind conditions.

Figure 4:
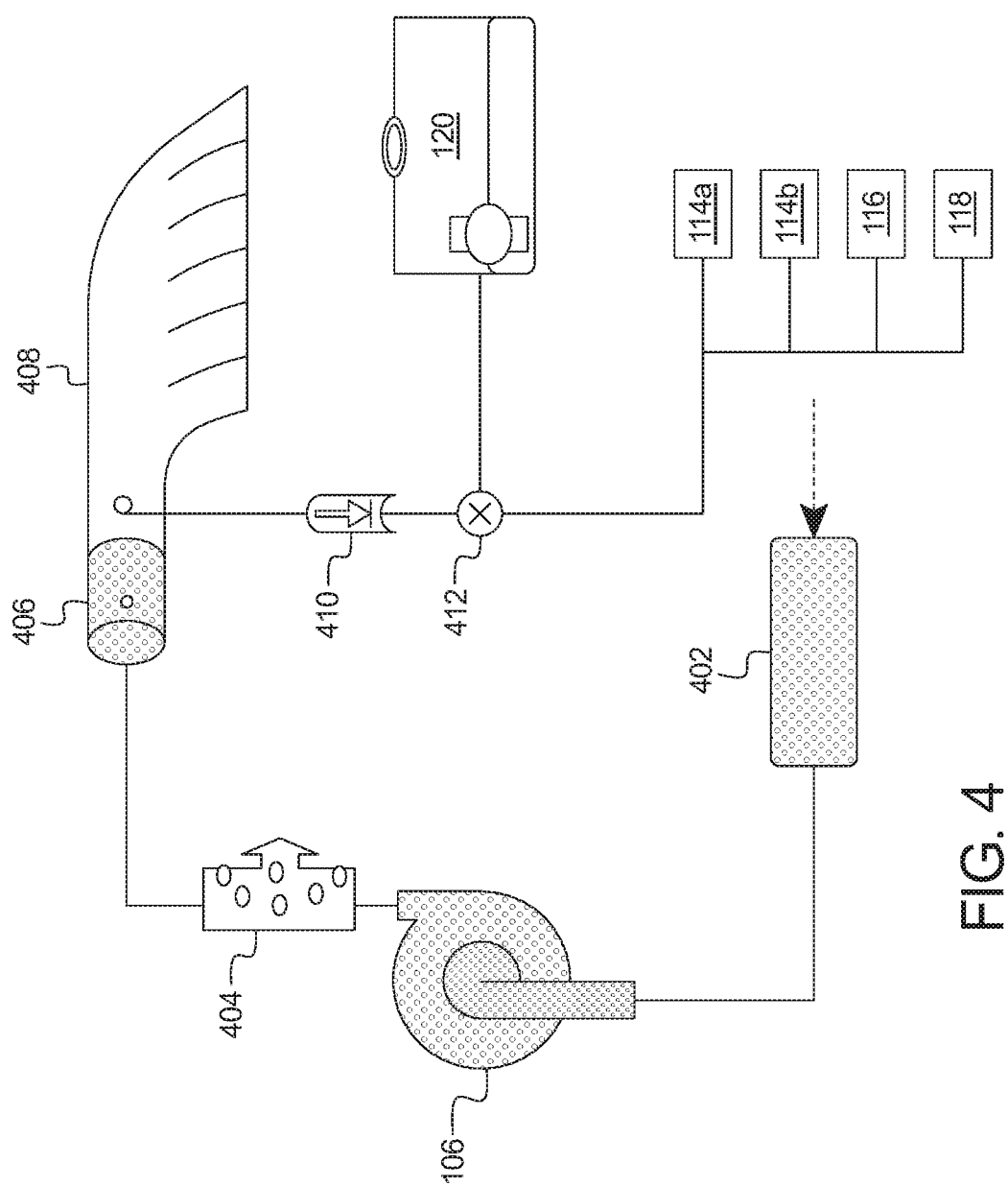
FIG. 4 is a schematic of an example nozzle cleaning system of the vehicle of FIG. 1 in accordance with the teachings herein.

FIG. 4 is a schematic of an example nozzle cleaning system 400 of the vehicle 100 in accordance with the teachings herein. In the illustrated example, the nozzle cleaning system 400 includes the eTurbo pump 106, the nozzle 114a, the nozzle 114b, the nozzle 116, the nozzle 118, and the reservoir 120. Further, the example nozzle cleaning system 400 includes an air filter 402, a charge air cooler 404, a throttle 406, an intake manifold 408, a check valve 410, and a three-way valve 412.

In the illustrated example, the air filter 402 of the nozzle cleaning system 400 collects air (indicated by an arrow in FIG. 4) from an environment in which the vehicle 100 is located. The eTurbo pump 106 receives the air, pressurizes the air, and sends the pressurized air to the throttle 406 of the engine 102 via the charge air cooler 404. When the engine 102 is on, the pressurized air provided by the eTurbo pump 106 increases the performance of the engine 102.

When the engine 102 is off, the pressurized air provided by the eTurbo pump 106 is utilized to unclog one or more of the nozzles 114, the nozzle 116, and the nozzle 118. As illustrated in FIG. 4, the pressurized air provided by the eTurbo pump 106 is collected from the intake manifold 408 and sent through the check valve 410 (e.g., to purge the pressurized air of contaminants). As a result of the engine 102 previously operating for a period of time, the engine 102 heats the pressurized air that is collected from the intake manifold 408. Further, the heated, pressurized air collected via the intake manifold 408 and washer fluid received from the reservoir 120 is fluidly mixed via the three-way valve 412. The mixture of the washer fluid and the heated, pressurized air is sprayed through the nozzle 114a, the nozzle 114b, the nozzle 116, and/or the nozzle 118 to unclog the nozzle 114a, the nozzle 114b, the nozzle 116, and/or the nozzle 118.

Figure 5:
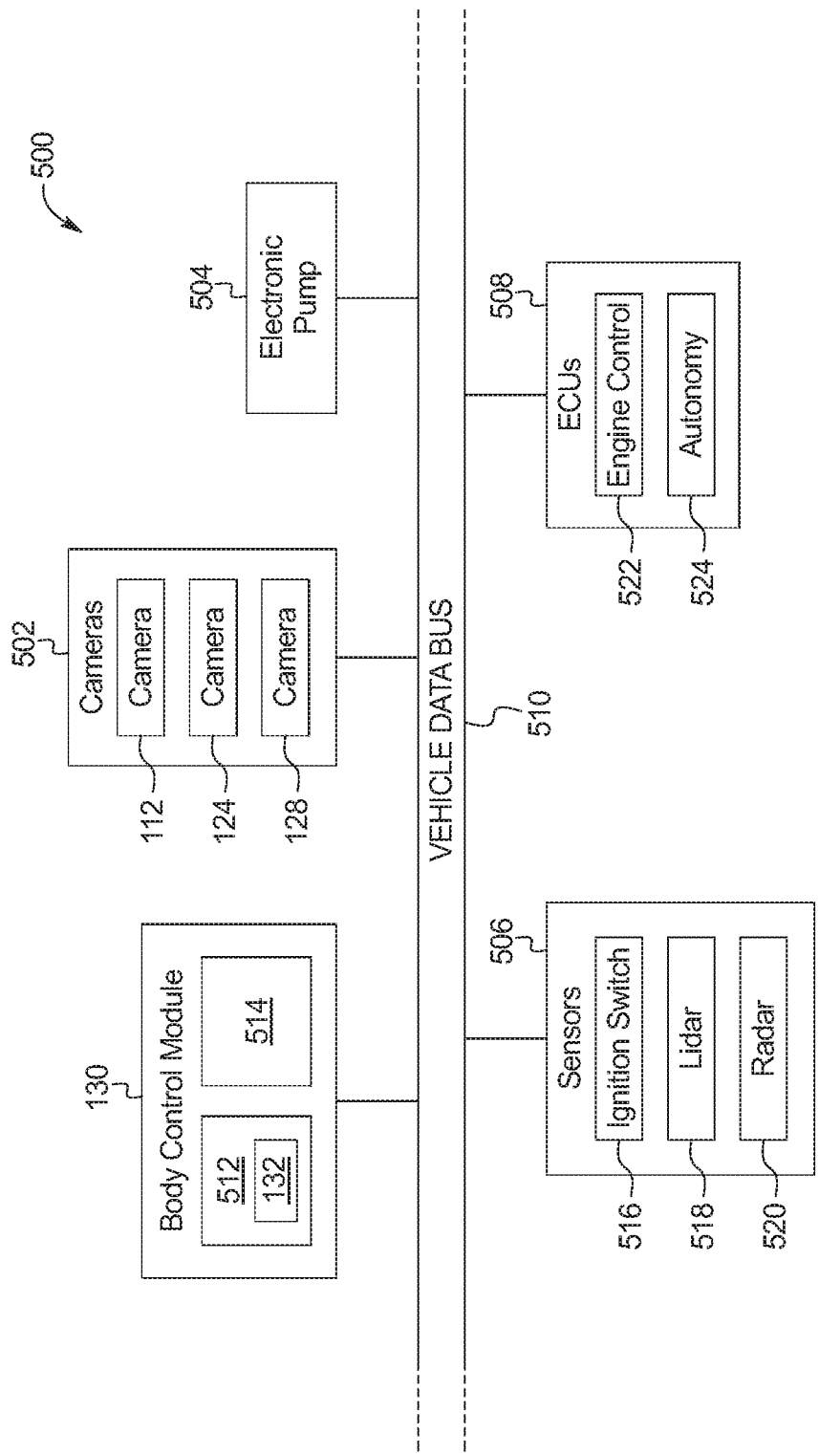
FIG. 5 is a block diagram of electronic components of the vehicle of FIG. 1.

FIG. 5 is a block diagram of electronic components 500 of the vehicle of FIG. 1. As illustrated in FIG. 5, the electronic components 500 include the body control module 130, cameras 502, an electronic pump 504, sensors 506, electronic control units (ECUs) 508, and a vehicle data bus 510.

The body control module 130 includes a microcontroller unit, controller or processor 512 and memory 514. In some examples, the processor 512 of the body control module 130 is structured to include the washer fluid controller 132. Alternatively, in some examples, the washer fluid controller 132 is incorporated into another electronic control unit (ECU) with its own processor 512 and memory 514. The processor 512 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 514 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 514 includes multiple kinds of memory, particularly volatile memory and non-volatile memory.

The memory 514 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 514, the computer readable medium, and/or within the processor 512 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The cameras 502 of the vehicle 100 capture image(s) and/or video that are analyzed and/or presented to occupant(s) of the vehicle 100. In the illustrated example, the cameras 502 include the camera 112 (e.g., a first rear-view camera), the camera 124 (e.g., a front-view camera), and the camera 128 (e.g., a second rearview camera). The image(s) and/or video captured by the camera 112, the camera 124, the camera 128, and/or any other of the cameras 502 (e.g., a camera embedded in a headlight, a camera embedded in a taillight, etc.) are analyzed to facilitate performance of autonomous driving maneuvers. Further, the image(s) and/or video captured by the camera 112 are utilized to determine whether a view of the camera 112 is obstructed, the image(s) and/or video captured by the camera 124 are utilized to determine whether a view through the windshield 108 is obstructed, and the image(s) and/or video captured by the camera 112 are utilized to determine whether a view through the windshield 110 is obstructed.

The electronic pump 504 pumps pressurized air through one or more washer fluid nozzles (e.g., the nozzle 114a, the nozzle 114b, the nozzle 116, the nozzle 118) of the vehicle 100 upon detection that one or more of those washer fluid nozzles is at least partially blocked or clogged. In some examples, the electronic pump 504 is the eTurbo pump 106 that pumps pressurized air to the engine 102 when the engine 102 is on to increase performance of the engine 102 and pumps heated, pressurized air through one or more of the washer fluid nozzles when the engine 102 of the vehicle 100 is off to unclog one or more of the washer fluid nozzles. In other examples, the electronic pump 504 is eVap (evaporative) sense detection pump that pumps pressurized air to a canister purge valve when the engine 102 is on to prevent fuel vapors in a fuel tank from escaping into the atmosphere and pumps pressurized air through one or more of the washer fluid nozzles when the engine 102 is off to unclog one or more of the washer fluid nozzles. That is, the electronic pump 504 that utilized to unclog the washer fluid nozzles when the engine 102 is off may also be dedicated to perform another function when the engine 102 is on. Additionally or alternatively, the electronic pump 504 may include any other device of the vehicle 100 that is capable of pumping pressurized air (e.g., heated, pressurized air) through at least partially blocked or clogged nozzles when the engine 102 is off. Further, in some examples, the electronic pump 504 is capable of pumping pressurized air (e.g., heated, pressurized air) through the at least partially blocked or clogged nozzles when the engine 102 is on.

The sensors 506 are arranged in and around the vehicle 100 to monitor properties of the vehicle 100 and/or an environment in which the vehicle 100 is located. One or more of the sensors 506 may be mounted to measure properties around an exterior of the vehicle 100. Additionally or alternatively, one or more of the sensors 506 may be mounted inside a cabin of the vehicle 100 or in a body of the vehicle 100 (e.g., an engine compartment, wheel wells, etc.) to measure properties in an interior of the vehicle 100. For example, the sensors 506 include accelerometers, odometers, tachometers, pitch and yaw sensors, wheel speed sensors, microphones, tire pressure sensors, biometric sensors and/or sensors of any other suitable type.

In the illustrated example, the sensors 506 include an ignition switch sensor 516, a lidar sensor 518, and a radar sensor 520. For example, the ignition switch sensor 516 detects a position (e.g., an off-position, a start position, an on-position, an accessory position) of the ignition switch 104 determine whether the engine 102 is on or off. For example, the engine 102 is identified as being on when the ignition switch sensor 516 detects that the ignition switch 104 is in the on-position; and the engine 102 is identified as being off when the ignition switch sensor 516 detects that the ignition switch 104 is in the off-position, the start position, or the accessory position. Further, lidar sensor 518 utilizes lasers and the radar sensor 520 utilizes radio waves to detect and/or locate object(s) near the vehicle 100 (e.g., the facilitate performance of autonomous driving maneuvers).

The ECUs 508 monitor and control the subsystems of the vehicle 100. For example, the ECUs 508 are discrete sets of electronics that include their own circuit(s) (e.g., integrated circuits, microprocessors, memory, storage, etc.) and firmware, sensors, actuators, and/or mounting hardware. The ECUs 508 communicate and exchange information via a vehicle data bus (e.g., the vehicle data bus 510). Additionally, the ECUs 508 may communicate properties (e.g., status of the ECUs 508, sensor readings, control state, error and diagnostic codes, etc.) to and/or receive requests from each other. For example, the vehicle 100 may have seventy or more of the ECUs 508 that are positioned in various locations around the vehicle 100 and are communicatively coupled by the vehicle data bus 510. In the illustrated example, the ECUs 508 include an engine control unit 522 and an autonomy unit 524. For example, the engine control unit 522 controls operation (e.g., turning on and/off) of the engine 102. Further, the autonomy unit 524 controls performance of autonomous and/or semi-autonomous driving maneuvers of the vehicle 100. For example, the autonomy unit 524 receives and analyzes the image(s) and/or video captures by the cameras 502 to control performance of autonomous and/or semi-autonomous driving maneuvers of the vehicle 100.

The vehicle data bus 510 communicatively couples the body control module 130, the cameras 502, the electronic pump 504, the sensors 506, and the ECUs 508. In some examples, the vehicle data bus 510 includes one or more data buses. The vehicle data bus 510 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
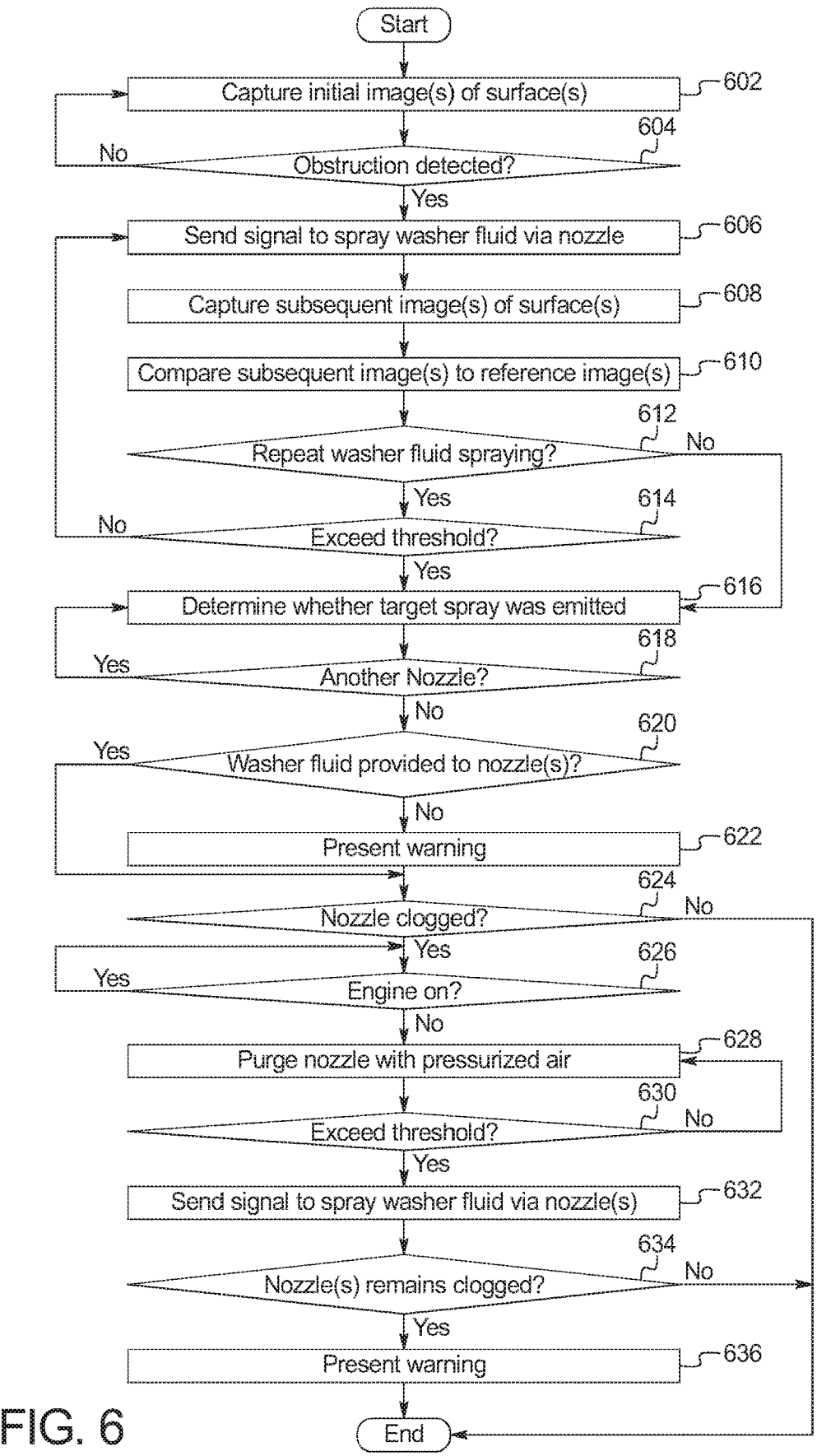
FIG. 6 is a flowchart for cleaning a washer fluid nozzle of the vehicle of FIG. 1 in accordance with the teachings herein.

FIG. 6 is a flowchart of an example method 600 to cleaning a washer fluid nozzle of a vehicle. The flowchart of FIG. 6 is representative of machine readable instructions that are stored in memory (such as the memory 514 of FIG. 5) and include one or more programs which, when executed by a processor (such as the processor 512 of FIG. 5), cause the vehicle 100 to implement the example washer fluid controller 132 of FIGS. 1 and 5. While the example program is described with reference to the flowchart illustrated in FIG. 6, many other methods of implementing the example washer fluid controller 132 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the washer fluid controller 132 receives initial image(s) and/or video of transparent surface(s) (e.g., the windshield 108 of FIGS. 1 and 3, the windshield 110 of FIG. 1, the lens of the camera 112 of FIG. 1) of the vehicle 100. For example, the camera 124 captures and sends the initial image(s) and/or video of the windshield 108 to the washer fluid controller 132, the camera 128 captures and sends the initial image(s) and/or video of the windshield 110 to the washer fluid controller 132, and the camera 112 captures and sends the initial image(s) and/or video of the lens of the camera 112 to the washer fluid controller 132. At block 604, the washer fluid controller 132 determines whether one or more of the transparent surfaces is obstructed by material (e.g., rain, snow, ice, debris, etc.) located on the surface(s). Responsive to the washer fluid controller 132 determining that none of the transparent surfaces are obstructed, the method 600 returns to block 602. Otherwise, responsive to the washer fluid controller 132 determining that one or more of the transparent surfaces is obstructed, the method 600 proceeds to block 606.

At block 606, the washer fluid controller 132 sends a signal to instruct nozzle(s) to spray the transparent surface(s) with washer fluid. For example, the washer fluid controller 132 instructs the nozzles 114 to spray the windshield 108 with washer fluid, instructs the nozzle 116 to spray the windshield 110 with washer fluid, and/or instructs the nozzle 118 to spray the lens of the camera 112 with washer fluid. At block 608, the washer fluid controller 132 receives subsequent image(s) and/or video of the transparent surface(s). For example, the camera 124 captures and sends the subsequent image(s) and/or video of the windshield 108 to the washer fluid controller 132, the camera 128 captures and sends the subsequent image(s) and/or video of the windshield 110 to the washer fluid controller 132, and the camera 112 captures and sends the subsequent image(s) and/or video of the lens of the camera 112 to the washer fluid controller 132. To enable the camera 124, the camera 128, and/or the camera 112 to capture the subsequent image(s) and/or video, the washer fluid controller 132 causes corresponding wipers (e.g., the windshield wipers 302 of FIG. 3) to wait a predetermined time after the washer fluid has been sprayed before activating.

At block 610, the washer fluid controller 132 compares the subsequent image(s) and/or video to corresponding reference image(s) and/or video that include target sprays. For example, the washer fluid controller 132 compares the subsequent image(s) and/or video of the windshield 108 to corresponding reference image(s) and/or video of the windshield 108 that include target sprays emitted by the nozzles 114. The washer fluid controller 132 compares the subsequent image(s) and/or video of the windshield 110 to corresponding reference image(s) and/or video of the windshield 110 that include a target spray emitted by the nozzle 116. The washer fluid controller 132 compares the subsequent image(s) and/or video of the lens of the camera 112 to corresponding reference image(s) and/or video of the lens of the camera 112 that include a target spray emitted by the nozzle 118.

At block 612, the washer fluid controller 132 determines whether to repeat the washer fluid spraying sequence. For example, the washer fluid controller 132 determines to repeat the washer fluid spraying sequence when the comparison(s) of the subsequent image(s) and/or video to the corresponding reference image(s) and/or video is inconclusive as to whether the target spray(s) were emitted. In response to the washer fluid controller 132 determining to repeat the washer fluid spraying sequence, the method 600 proceeds to block 614 at which the washer fluid controller 132 determines whether a predetermined threshold of washer fluid spraying sequences has been exceeded. In response to the washer fluid controller 132 determining that the predetermined threshold has not been exceeded, the method 600 returns to block 606 to repeat the washer fluid spraying sequence. Otherwise, in response to the washer fluid controller 132 determining at block 614 that the predetermined threshold has been exceeded or determining at block 612 not to repeat the washer fluid spraying sequence, the method 600 proceeds to block 616.

At block 616, the washer fluid controller 132 determines whether a target spray was emitted by one of the washer fluid nozzles (e.g., the nozzle 114a) based upon the corresponding comparison of the subsequent and reference image(s) and/or video. At block 618, the washer fluid controller 132 determines whether there is another washer fluid nozzle. In response to identifying that there is another washer fluid nozzle (e.g., the nozzle 114b, the nozzle 116, the nozzle 118), the method 600 returns to block 616. Upon identifying that there is no other washer fluid nozzle, the method 600 proceeds to block 620.

At block 620, the washer fluid controller 132 determines whether washer fluid was provided to each of the washer fluid nozzles. For example, the washer fluid controller 132 determines that delivery of washer fluid to the nozzles 114, the nozzle 116, and the nozzle 118 is impeded if the washer fluid controller 132 detects that none of the target sprays were emitted and/or delivery of washer fluid to the nozzle 116 and the nozzle 118 is impeded if the washer fluid controller 132 detects that the third target spray and the fourth target spray were not emitted while the first target spray and the second target spray were emitted. In response to determining that washer fluid was not provided to one or more of the washer fluid nozzles, the method 600 proceeds to block 622 at which the washer fluid controller 132 provides a corresponding alarm to occupant(s) of the vehicle 100. Otherwise, in response to determining that washer fluid was provided to one or more of the washer fluid nozzles, the method 600 proceeds to block 624.

At block 624, the washer fluid controller 132 determines whether one or more of the washer fluid nozzles is clogged. For example, the washer fluid controller 132 identifies a clogged washer fluid nozzle if the washer fluid nozzle emits a partially block spray. Additionally or alternatively, the washer fluid controller 132 identifies that the nozzle 114a and/or the nozzle 114b is clogged if the washer fluid controller 132 detects that the first target spray and the second target spray were not emitted while the third target spray and/or the fourth target spray were emitted. The washer fluid controller 132 identifies that the nozzle 116 is clogged if the third target spray was not emitted while the fourth target spray was emitted. The washer fluid controller 132 identifies that the nozzle 118 is clogged if the washer fluid controller 132 detects that the fourth target spray was not emitted while the third target spray was emitted. In response to determining that none of the washer fluid nozzles is clogged, the method 600 ends. Otherwise, in response to determining that one or more of the washer fluid nozzles is clogged, the method 600 proceeds to block 626.

At block 626, the washer fluid controller 132 determines whether the engine 102 is on. The method 600 remains at block 626 until the washer fluid controller 132 determines that the engine 102 is off. Upon the washer fluid controller 132 determining that the engine 102 is off, the method 600 proceeds to block 628 at which the washer fluid controller causes the clogged washer fluid nozzles to be purged with a pressurized air (e.g., heated pressurized air) via the electronic pump 504 (e.g., the eTurbo pump 106). In some examples, one or more of the unclogged washer fluid nozzles may be purged with the pressurized air. In some examples, the washer fluid nozzles are purged with a mixture of pressurized air and washer fluid. At block 630, the washer fluid controller 132 determines whether a predetermined threshold of purge sequences has been exceeded. In response to determining that the predetermined threshold has not been exceeded, the method returns to block 628 to repeat the purge sequence. Upon determining that the predetermined threshold has been exceeded, the method proceeds to block 632.

At block 632, the washer fluid controller 132 sends another signal to instruct the washer fluid nozzles to spray washer fluid. Further, the washer fluid controller 132 instructs the cameras to capture another set of image(s) and/or video of the transparent surfaces upon instructing the washer fluid nozzles to spray the washer fluid. At block 634, the washer fluid controller 132 determines whether one or more of the washer fluid nozzles remain clogged by comparing the image(s) and/or video captured at block 632 to the corresponding reference image(s) and/or video. In response to determining that the washer fluid nozzles are unclogged, the method 600 ends. Otherwise, prior to the method 600 ending, the washer fluid controller 132 presents a warning to the occupant(s) of the vehicle 100 indicating that one or more of the washer fluid nozzles remain clogged. In some such examples, the warning indicates which of the washer fluid nozzles remain clogged.

Upon determining that the nozzle 114a, the nozzle 114b, the nozzle 116, and/or the nozzle 118 is clogged, the washer fluid controller 132 instructs the eTurbo pump 106 and/or another pump to pump pressurized air (e.g., heated pressurized air) through the nozzle 114a, the nozzle 114b, the nozzle 116, and/or the nozzle 118 when the engine 102 is off.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a windshield;
a camera configured to capture images of the windshield;
a first nozzle and a second nozzle; and
a washer fluid controller configured to:
instruct the camera to capture a first image of the windshield;
identify, based on the image, an obstruction on the windshield;
instruct, based on identifying the obstruction, the first nozzle and the second nozzle to spray washer fluid on the windshield;
instruct the camera to capture a second image of the windshield;
determine, based on the second image, that only the first nozzle emitted a target spray; and
pump, based on determining that only the first nozzle emitted a target spray, pressurized air through the second nozzle.

2. The vehicle of claim 1, wherein the camera is located within a vehicle cabin and configured to capture other images through the windshield to facilitate autonomous driving maneuvers.

3. The vehicle of claim 1, further including:
a reservoir configured to contain the washer fluid; and
a washer fluid line configured to fluidly couple the reservoir and the first nozzle and the second nozzle to facilitate delivery of the washer fluid to the first nozzle and the second nozzle from the reservoir.

4. The vehicle of claim 1, further including a windshield wiper, wherein the washer fluid controller is configured to delay operation of the windshield wiper relative to the first nozzle and the second nozzle spraying the washer fluid to enable the camera to collect the second image prior to the windshield wiper wiping the windshield.

5. The vehicle of claim 1, further including an ignition switch sensor configured to determine whether an engine of the vehicle is on or off.

6. The vehicle of claim 1, further including an eTurbo pump configured to provide the pressurized air that is heated through the first nozzle and the second nozzle based on a determination that an engine of the vehicle is off.

7. The vehicle of claim 1, further including:
a second windshield, wherein the windshield is a front windshield and the second windshield is a rear windshield;

a second camera configured to capture images of the second windshield; and a third nozzle configured to spray the second windshield with a third target spray.

8. The vehicle of claim 7, wherein the washer fluid controller is configured to determine that delivery of the washer fluid to the third nozzle is impeded in response to detecting that the third target spray were not emitted.

9. The vehicle of claim 7, further including a rearview camera and a fourth nozzle that is configured to spray a lens of the rearview camera with a fourth target spray of the washer fluid.

10. The vehicle of claim 9, wherein the washer fluid controller is configured to determine that delivery of the washer fluid to the third nozzle and the fourth nozzle is impeded in response to detecting that the third target spray and the fourth target spray were not emitted.

11. The vehicle of claim 9, wherein the washer fluid controller is configured to pump the pressurized air through the the third nozzle and the fourth nozzle in response to detecting that at least one of the third target spray and the fourth target spray was not emitted.

12. A vehicle with a washer fluid delivery system comprising:
- a camera including a lens;
- a nozzle; and
- a washer fluid controller configured to execute instructions stored in memory to:
  - instruct the nozzle to spray washer fluid responsive to detecting the lens is obstructed based upon a first image;
  - determine that the nozzle failed to emit a target spray based upon a second image, where the determination is made based on a comparison between the second image and a reference image including a target spray; and
  - pump pressurized air through the nozzle upon detecting the target spray was not emitted.

\* \* \* \* \*